United States Patent
Huang

(10) Patent No.: US 10,851,935 B1
(45) Date of Patent: Dec. 1, 2020

(54) TABLET ELECTRONIC PRODUCT SUPPORTING FRAME

(71) Applicant: Ming Hua Huang, Kaohsiung (TW)

(72) Inventor: Ming Hua Huang, Kaohsiung (TW)

( * ) Notice: Subject to any disclaimer, the term of this patent is extended or adjusted under 35 U.S.C. 154(b) by 63 days.

(21) Appl. No.: 16/430,399

(22) Filed: Jun. 3, 2019

(51) Int. Cl.
*F16M 11/04* (2006.01)
*G06F 1/16* (2006.01)

(52) U.S. Cl.
CPC ......... *F16M 11/041* (2013.01); *G06F 1/1637* (2013.01); *F16M 2200/02* (2013.01)

(58) Field of Classification Search
CPC .............. E05B 73/0082; F16M 11/041; F16M 2200/02; A47F 7/0246; B60R 11/0252
See application file for complete search history.

(56) References Cited

U.S. PATENT DOCUMENTS

| | | | | |
|---|---|---|---|---|
| 5,595,074 A * | 1/1997 | Munro | ................. | E05B 73/0082 248/551 |
| 6,504,710 B2 * | 1/2003 | Sutton | ................. | B60R 11/0252 312/223.1 |
| 6,700,488 B1 * | 3/2004 | Leyden | ............... | G08B 13/1463 340/568.1 |
| 8,701,452 B2 * | 4/2014 | Foster | ................. | E05B 73/0082 70/19 |
| 8,711,553 B2 * | 4/2014 | Trinh | .................... | F16M 11/041 361/679.02 |
| 9,097,380 B2 * | 8/2015 | Wheeler | ................. | F16M 13/00 |
| 10,448,759 B1 * | 10/2019 | Chapuis | .................... | A47F 5/16 |
| 2010/0148030 A1 * | 6/2010 | Lin | ...................... | B60R 11/0252 248/371 |
| 2010/0155562 A1 * | 6/2010 | He | ......................... | F16M 11/046 248/425 |
| 2011/0133050 A1 * | 6/2011 | Eisenberger, Sr. | .... | F16M 13/00 248/551 |
| 2012/0037783 A1 * | 2/2012 | Alexander | .............. | A47F 7/024 248/551 |
| 2012/0312936 A1 * | 12/2012 | Huang | .................... | F16M 13/00 248/122.1 |
| 2013/0301216 A1 * | 11/2013 | Trinh | ..................... | A47F 7/0246 361/679.58 |
| 2017/0188724 A1 * | 7/2017 | Lin | ....................... | F16M 11/041 |
| 2018/0266455 A1 * | 9/2018 | Smith | ................. | F16M 11/2021 |
| 2018/0279809 A1 * | 10/2018 | Regan | .................... | F16B 43/025 |
| 2020/0107653 A1 * | 4/2020 | Leyden | .................... | A47F 7/024 |

* cited by examiner

*Primary Examiner* — Bradley Duckworth
(74) *Attorney, Agent, or Firm* — Leong C. Lei

(57) ABSTRACT

A tablet electronic product supporting frame includes an encapsulation box. The encapsulation box is rotatably coupled, at a front side thereof, with a carriage base. The carriage base has four fastening members to respectively couple with an upper clamp member, a lower clamp member, a left clamp member, and a right clamp member, so that the upper clamp member, the lower clamp member, the left clamp member, and the right clamp member are rotatably mounted to the carriage base and are allowed to adjust of the positions thereof for clamping. The carriage base is provided, on a front surface thereof, with a backing plate that is mounted thereto by an adjustment screw rod. As such, a supporting frame that is fit to carry and support tablet electronic products of various sizes and helps improve stability and burglary protection is provided.

1 Claim, 11 Drawing Sheets

TABLET ELECTRONIC PRODUCT SUPPORTING FRAME

TECHNICAL FIELD OF THE INVENTION

The present invention relates to a tablet electronic product supporting frame, and more particularly to a supporting frame that is fit to carry and support tablet electronic products of various sizes and helps improve stability and burglary protection.

DESCRIPTION OF THE PRIOR ART

Tablet electronic products, such as tablet computers, screen-convertible notebook computers, and electronic books, have many advantages, such as easy carrying, high performance, and simple operation and are widely used by the general public, professional persons, and catering service businesses. However, such tablet computers are not equipped with a holder or a support base to allow the tablet computers to be positioned in an erected or slanted condition, and consequently, such tablet devices can only be placed flat on a tabletop or held by one hand for operation.

To overcome the above problem of inconvenience of operation of such tablet electronic devices, various designs of support bases or stands have been developed and are available in the market for receiving a tablet electronic product to position thereon. However, such support stands are structured to fix a tablet electronic product by clamping and holding a periphery or diagonal corners of the tablet electronic product, while leaving a back side of the tablet electronic product unsupported by any supporting member arranged at the back side. Consequently, vibration or shaking may occur when a user is operating a tablet electronic product, leading to instability. Further, the support devices that are available in the market are often made to suit to only one or a very limited number of sizes of electronic products. Once a new or replacement tablet electronic product having a different size is purchased, a supporting stand of a corresponding size must also be used in substitute of the old one. Particularly, the known support devices that are currently available in the market are designed to carry and support relatively thin tablet electronic products but are not fit for tablet electronic products of relatively enlarged thicknesses or notebook computers having convertible screen. Apparently, the known tablet electronic product support devices are deficient in respect of inconvenience of practical uses.

SUMMARY OF THE INVENTION

An objective of the present invention is to alleviate the above-discussed drawbacks by providing a supporting frame that is fit to carry and support tablet electronic products of various sizes and helps improve stability and burglary protection.

To achieve the above objective, the present invention provides a supporting frame, which comprises an encapsulation box, a carriage base, an upper clamp member, a lower clamp member, a left clamp member, and a right clamp member, wherein:

the encapsulation box is in the form of a box, the encapsulation box being provided with pivot pins on one side portion thereof, the pivot pins being provided for rotatably coupling with the carriage base, so that the carriage base is rotatable about a support axis defined by the pivot pins to selectively open or close the encapsulation box, the encapsulation box being also provided with a locking member;

the carriage base is rotatably mounted to the pivot pins of the encapsulation box, the carriage base having a rear surface that is provided, on an upper part, a lower part, a left part, and a right part thereof, with constraint sections, the carriage base being provided with an upper clamp member, a lower clamp member, a left clamp member, and a right clamp member, each of the upper clamp member, the lower clamp member, the left clamp member, and the right clamp member having an outer end that is formed with an engaging and retaining section, each of the upper clamp member, the lower clamp member, the left clamp member, and the right clamp member being formed with a guide slot, which receives a fastening member to penetrate therethrough, each of the fastening members being rotatably mounted to the carriage base, such that the upper clamp member and the lower clamp member are constrained by the constraint sections and the fastening members to be movable along a vertically extending straight line and the left clamp member and the right clamp member are constrained by the constraint sections and the fastening member to be movable along a horizontally extending straight line, wherein rotating and tightening the fastening members selectively set the upper clamp member, the lower clamp member, the left clamp member, and the right clamp member immobile in fixed positions, the carriage base being provided with an adjustment screw rod rotatably mounted thereto, the adjustment screw rod having a front end extending to a front surface of the carriage base, the front end of the adjustment screw rod being provided with a backing plate, a rear end of the adjustment screw rod being provided with a handle, so that rotating the handle drives the backing plate to move frontward or rearward, the carriage base being provided with a locking hole, which corresponds to the locking member of the encapsulation box to allow the carriage base to be locked to and fixed with the encapsulation box;

whereby a supporting frame that is capable of carrying and supporting tablet electronic products of various sizes and helps improve stability and burglary protection is provided.

DETAILED DESCRIPTION OF THE PREFERRED EMBODIMENT

The technical solution that the present invention adopts to achieve the above objective, and the structure thereof, will be described, in detail, with reference to embodiments illustrated in FIGS. 1-11.

Figure 1:
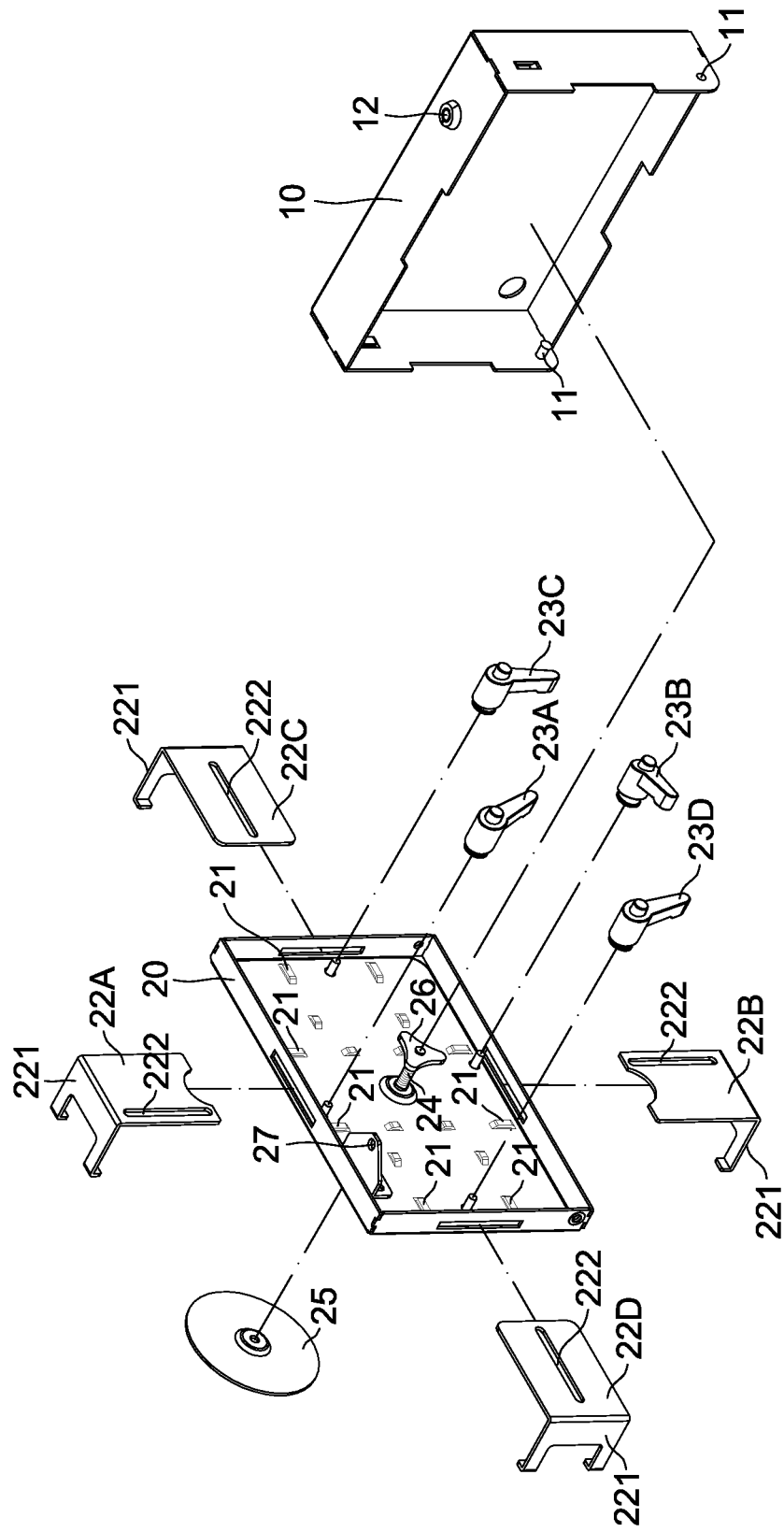
FIG. 1 is an exploded view of the present invention.
Figure 2:
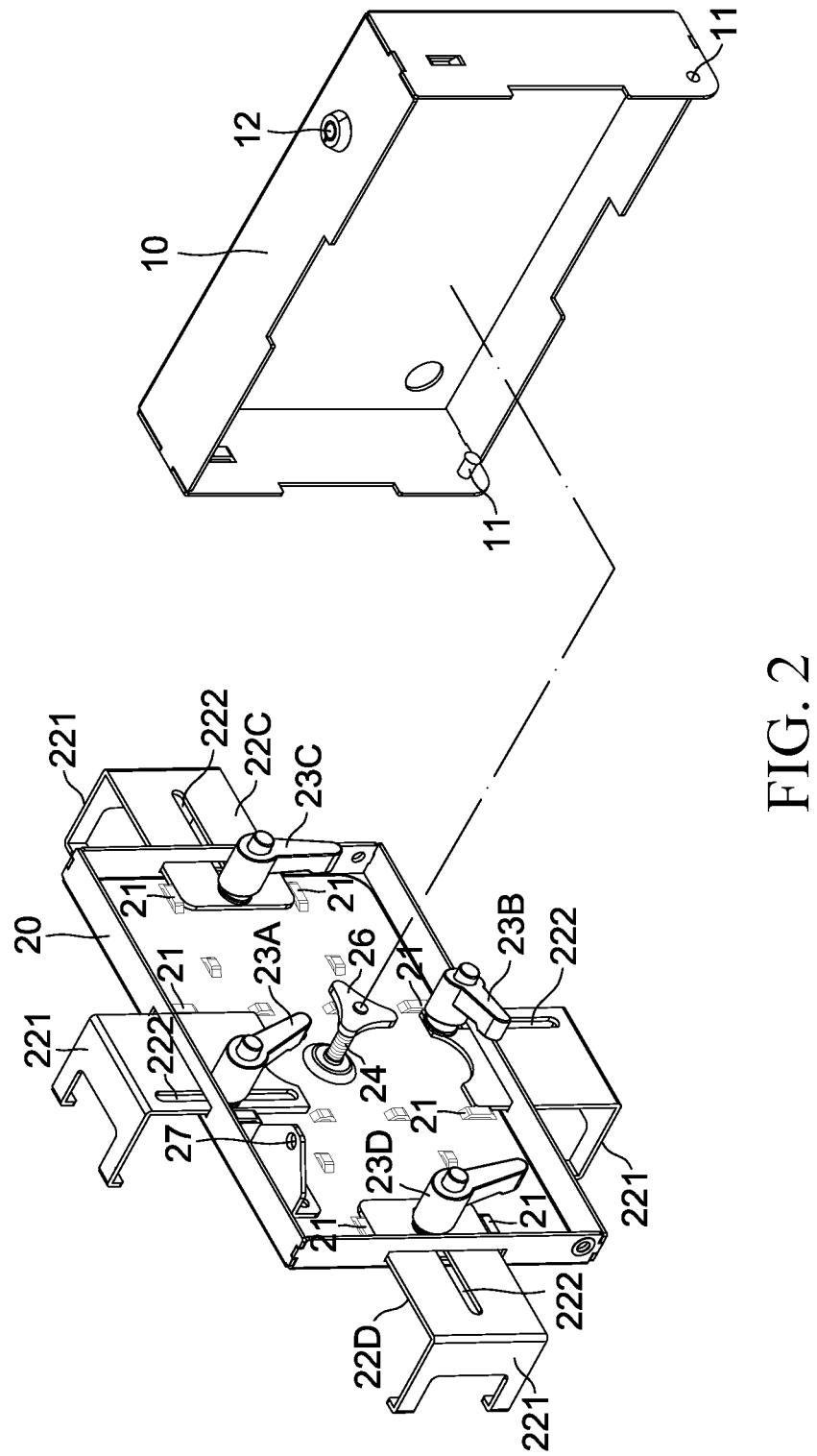
FIG. 2 is another exploded view of the present invention.
Figure 3:
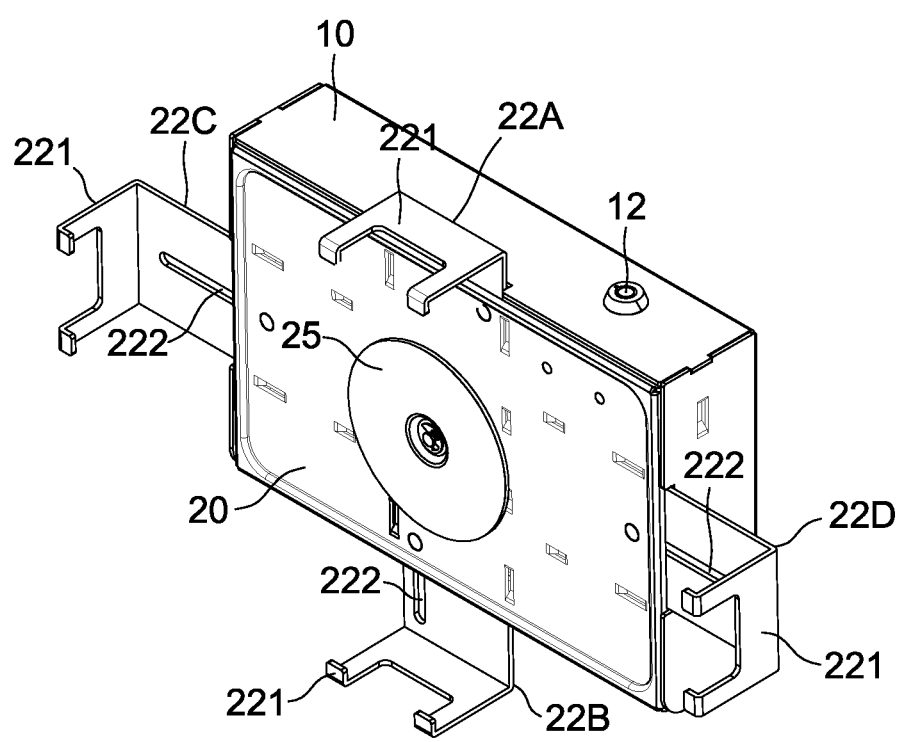
FIG. 3 is a perspective view of the present invention in an assembled condition.

As shown in FIG. 1, an embodiment is illustrated, in which a supporting frame comprises an encapsulation box 10 and a carriage base 20.

The encapsulation box 10 (see both FIGS. 2 and 3) is of a box-like structure. The encapsulation box 10 is provided, on one side part thereof, with pivot pins 11. The pivot pins 11 are provided for rotatably coupling with the carriage base 20, so that the carriage base 20 is rotatable about a support axis defined by the pivot pins 11 to selectively open or close the encapsulation box 10. The encapsulation box 10 is provided with a locking member 12.

Figure 4:
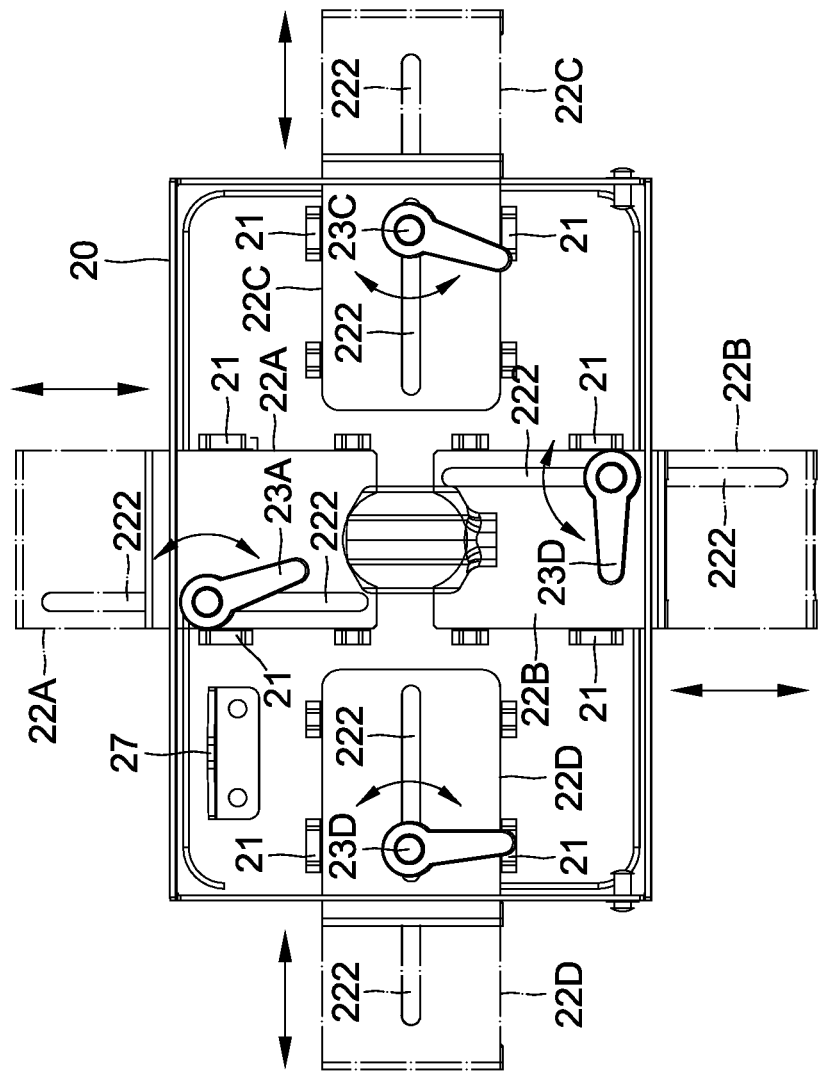
FIG. 4 is a rear view of a carriage base of the present invention.

The carriage base 20 (see FIGS. 2, 3, and 4 collectively) is rotatably mounted to the pivot pins 11 of the encapsulation box 10. The carriage base 20 has a rear surface that is provided, on an upper part, a lower part, a left part, and a right part thereof, with constraint sections 21. The carriage base 20 is provided with an upper clamp member 22A, a lower clamp member 22B, a left clamp member 22C, and a right clamp member 22D. Each of the upper clamp member 22A, the lower clamp member 22B, the left clamp member 22C, and the right clamp member 22D has an outer, distal end that is formed with an engaging and retaining section 221, and each of the upper clamp member 22A, the lower clamp member 22B, the left clamp member 22C, and the right clamp member 22D is formed with a guide slot 222. Each of the guide slots 222 is provided with a fastening member 23A, 23B, 23C, 23D penetrating therethrough. Each of the fastening members 23A, 23B, 23C, 23D is rotatably mounted to the carriage base 20, such that the upper clamp member 22A and the lower clamp member 22B are constrained by the constraint sections 21 and the fastening members 23A, 23B to be only movable upward and downward along a straight line, and the left clamp member 22C and the right clamp member 22D are constrained by the constraint sections 21 and the fastening members 23C, 23D to be only movable leftward and rightward along a straight line (as shown in FIG. 4). Further, the fastening members 23A, 23B, 23C, 23D are rotatable for tightening so as to selectively keep the upper clamp member 22A, the lower clamp member 22B, the left clamp member 22C, and the right clamp member 22D immobile in fixed position. Further, the carriage base 20 is provided with an adjustment screw rod 24 rotatably mounted thereto such that a front end of the adjustment screw rod 24 extends to a front surface of the carriage base 20. The front end of the adjustment screw rod 24 is provided with a backing plate 25, and a rear end of the adjustment screw rod is provided with a handle 26, so that rotation of the handle 26 drives the backing plate 25 to move frontward or rearward. Further, the carriage base is also provided with a locking hole 27, such that the locking hole 27 corresponds to the locking member 12 of the encapsulation box 10 to allow the carriage base 20 to be locked to and fixed with the encapsulation box 10.

Figure 5:
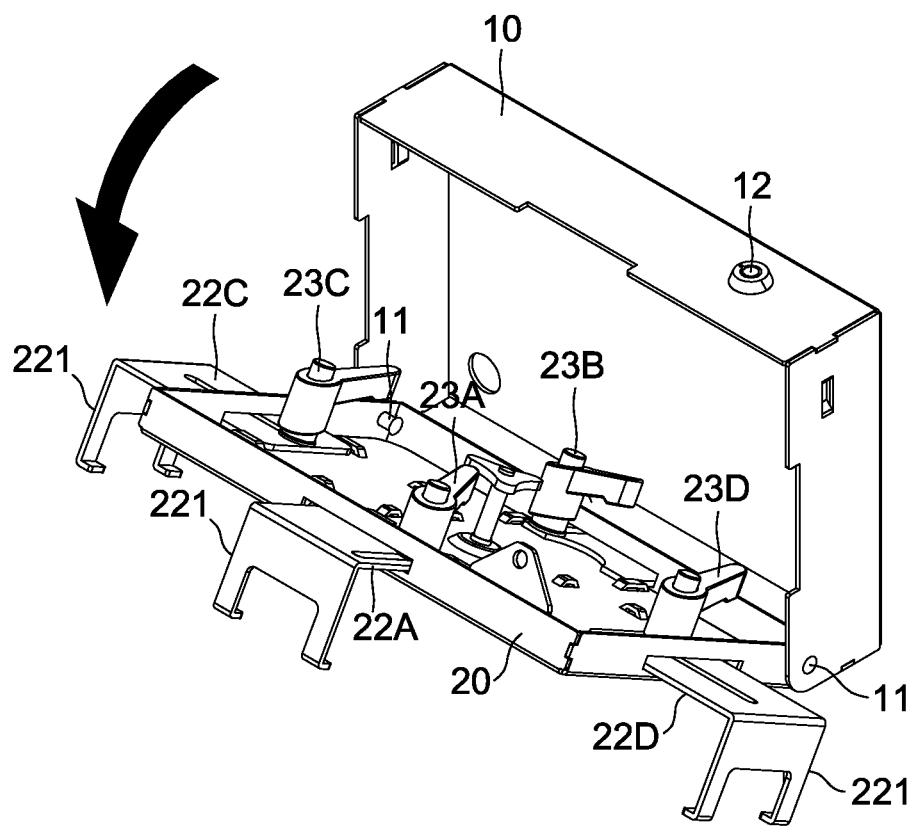
FIG. 5 is a perspective view of the present invention, illustrating a carriage seat is turned downward for opening.
Figure 6:
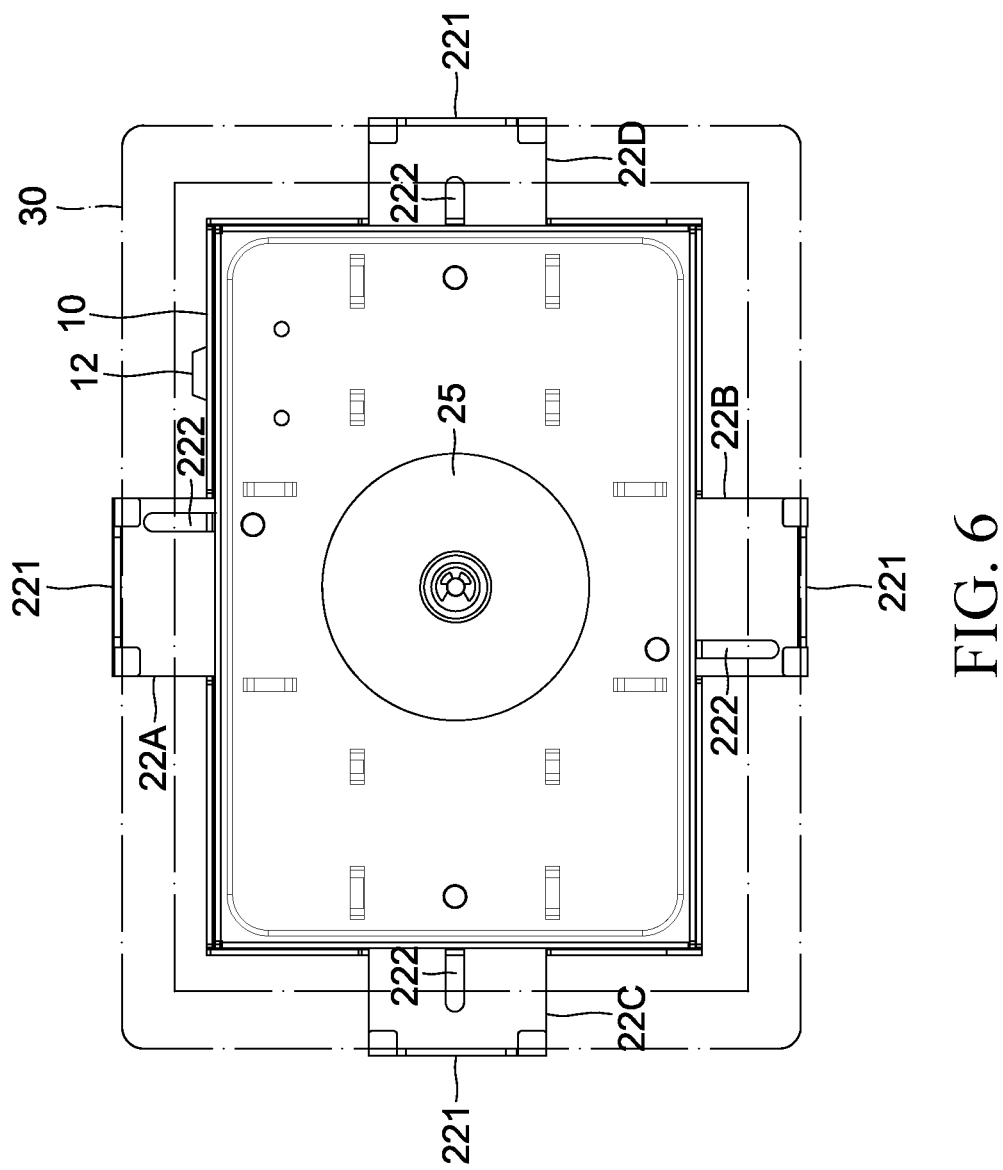
FIG. 6 is a front view of the present invention, illustrating a tablet electronic product is clamped and fixed thereon.

With the above structural arrangement, to mount a tablet electronic product 30 on the carriage base 20 for use, the carriage base 20 is turned open to expose the rear surface of the carriage base 20 (as shown in FIG. 5), and then, the fastening members 23A, 23B, 23C, 23D are rotated and loosened. According to a size of the tablet electronic product 30, positions of the upper clamp member 22A and the lower clamp member 22B are adjusted through moving upward/downward along the vertical straight line and positions of the left clamp member 22C and the right clamp member 22D are adjusted through moving leftward/rightward along the horizontal straight line (as shown in FIG. 5), so that the engaging and retaining sections 221 of the upper clamp member 22A, the lower clamp member 22B, the left clamp member 22C, and the right clamp member 22D are set in engagement with and thus clamp and fix the tablet electronic product 30. Afterwards, each of the fastening members 23A, 23B, 23C, 23D are rotated to get tightened, so as to make the positions of the upper clamp member 22A, the lower clamp member 22B, the left clamp member 22C, and the right clamp member 22D fixed and immobile (as shown in FIG. 6) to thereby prevent the tablet electronic product 70 from dropping and damaged.

Figure 7:
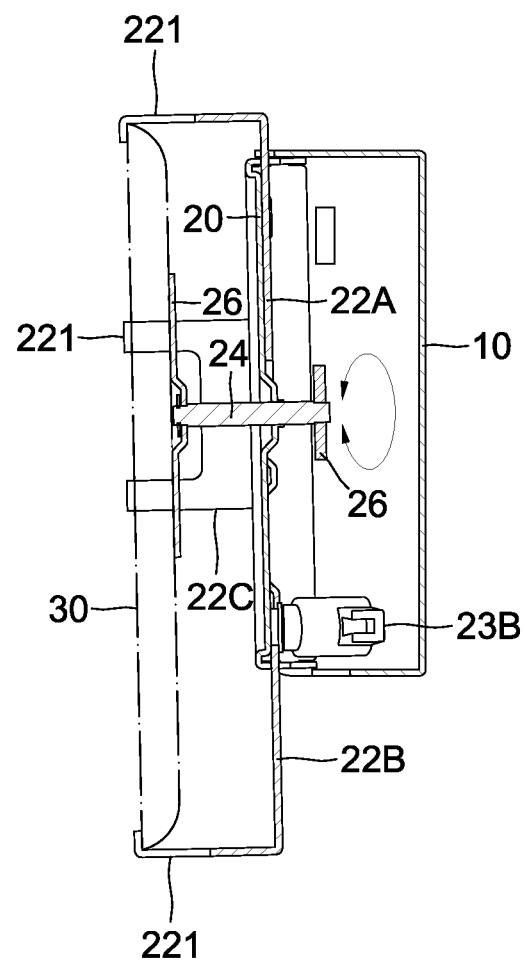
FIG. 7 is a cross-sectional view of the present invention, illustrating a backing plate supports on a back side of a tablet electronic product.

Then, the handle 26 arranged on the rear side of the carriage base 20 is rotated to drive the adjustment screw rod 24 and cause the backing plate 25 to move and abut against the a rear surface of the tablet electronic product 30 (as shown in FIG. 7), so as to have the tablet electronic product 30 in tight engagement with and retained between the engaging and retaining sections 221 of the upper clamp member 22A, the lower clamp member 22B, the left clamp member 22C, and the right clamp member 22D and the backing plate 25 to thereby constrain and fix the tablet electronic product 30 in position without displacing and vibrating. Then, the carriage base 20 is turned toward the encapsulation box 10 for closing and the locking hole 27 of the carriage base 20 is brought into alignment and thus in locking engagement with the locking member 12 of the encapsulation box 10 and this makes the carriage base 20 and the encapsulation box 10 closed and fixed together.

To remove the tablet electronic product 3, the locking engagement between the locking member 12 and the locking hole 27 is released to allow the carriage base 20 to be turned open, and then, each of the fastening members 23A, 23B, 23C, 23D are rotated and loosened to allow the upper clamp member 22A, the lower clamp member 22B, the left clamp member 22C, and the right clamp member 22D to be free to move so that the upper clamp member 22A, the lower clamp member 22B, the left clamp member 22C, and the right clamp member 22D are no longer kept in clamping engagement with the tablet electronic product 30. Then, the tablet electronic product 30 can be detached and removed.

Figure 8:
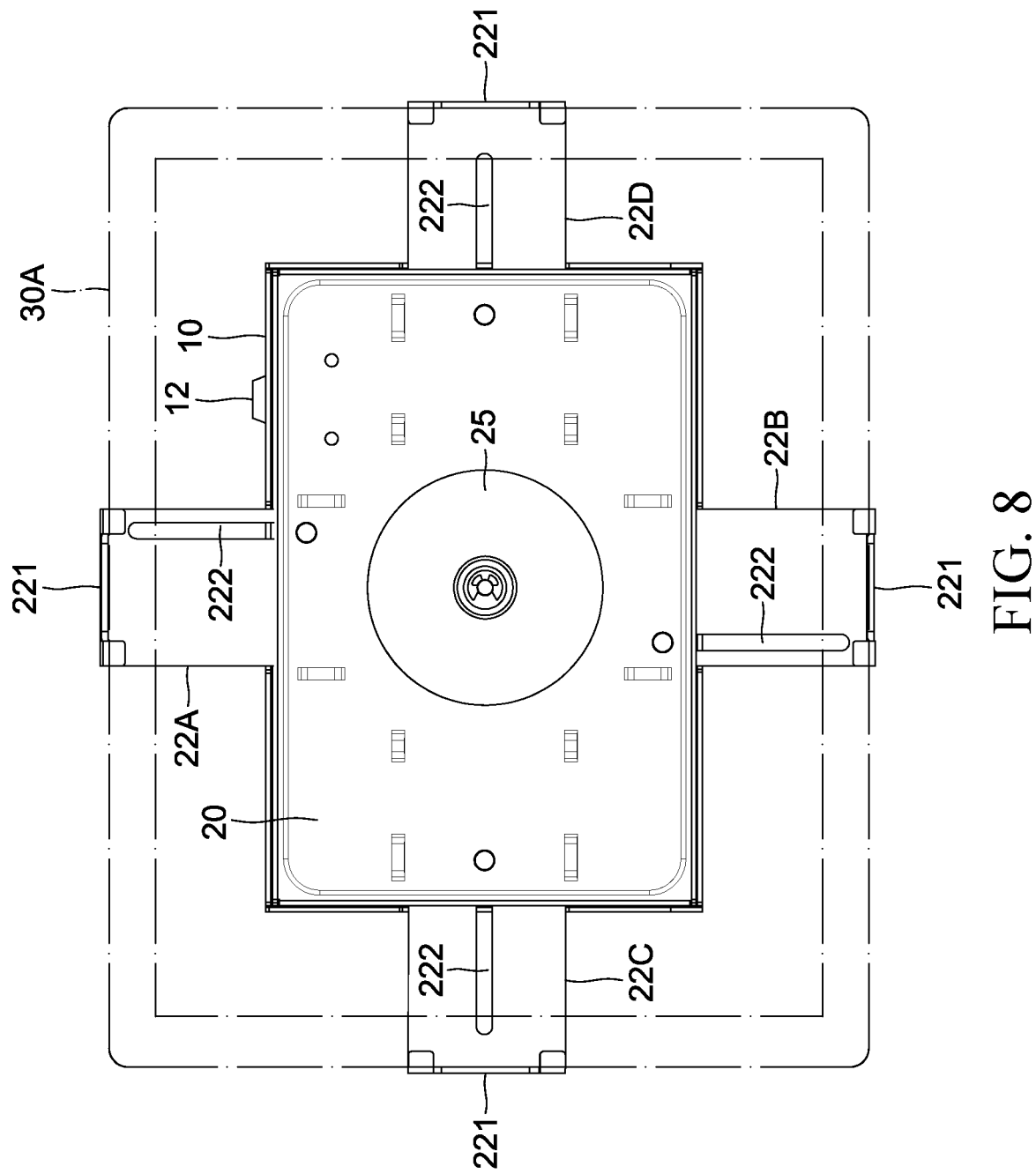
FIG. 8 is a front view of the present invention, illustrating a tablet electronic product of an enlarged size is clamped and fixed thereon.

It could be understood from the above description that the present invention provides the following advantages:

(1) In the present invention, the upper clamp member 22A, the lower clamp member 22B, the left clamp member 22C, and the right clamp member 22D are rotatably mounted to the rear surface of the carriage base 20 by means of the guide slot 222 formed therein and the fastening members 23A, 23B, 23C, 23D attached thereto, so that the upper clamp member 22A, the lower clamp member 22B, the left clamp member 22C, and the right clamp member 22D are allowed to freely adjust of the positions thereof (as shown in FIG. 4) and thus, an accommodation space or clamping space defined thereby can be freely adjustable as desired. Thus, the present invention is fit for clamping and fixing tablet electronic products 30, 30A (as shown in FIGS. 6 and 8) of different lengths and widths.

Figure 9:
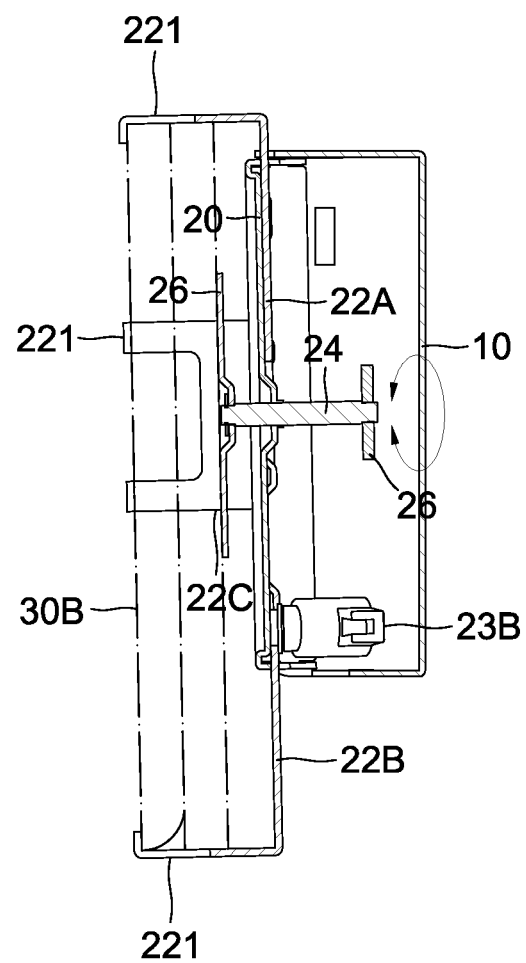
FIG. 9 is a cross-sectional view of the present invention, illustrating the backing plate supports on a back side of a tablet electronic product having a tablet electronic product having an increased thickness.
Figure 10:
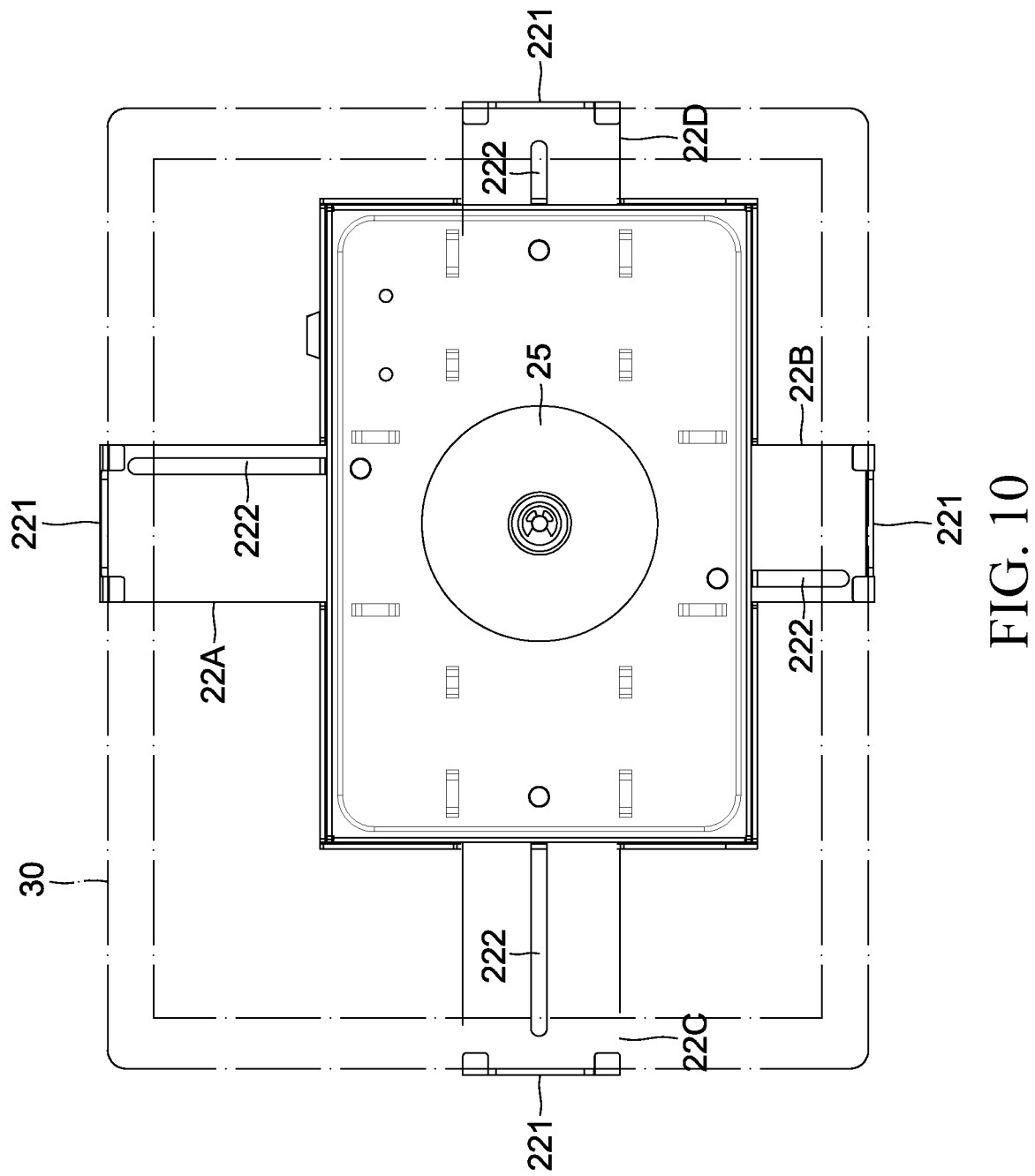
FIG. 10 is a front view of the present invention, illustrating a tablet electronic product is clamped and fixed thereon at a location rather than a central position thereof.
Figure 11:
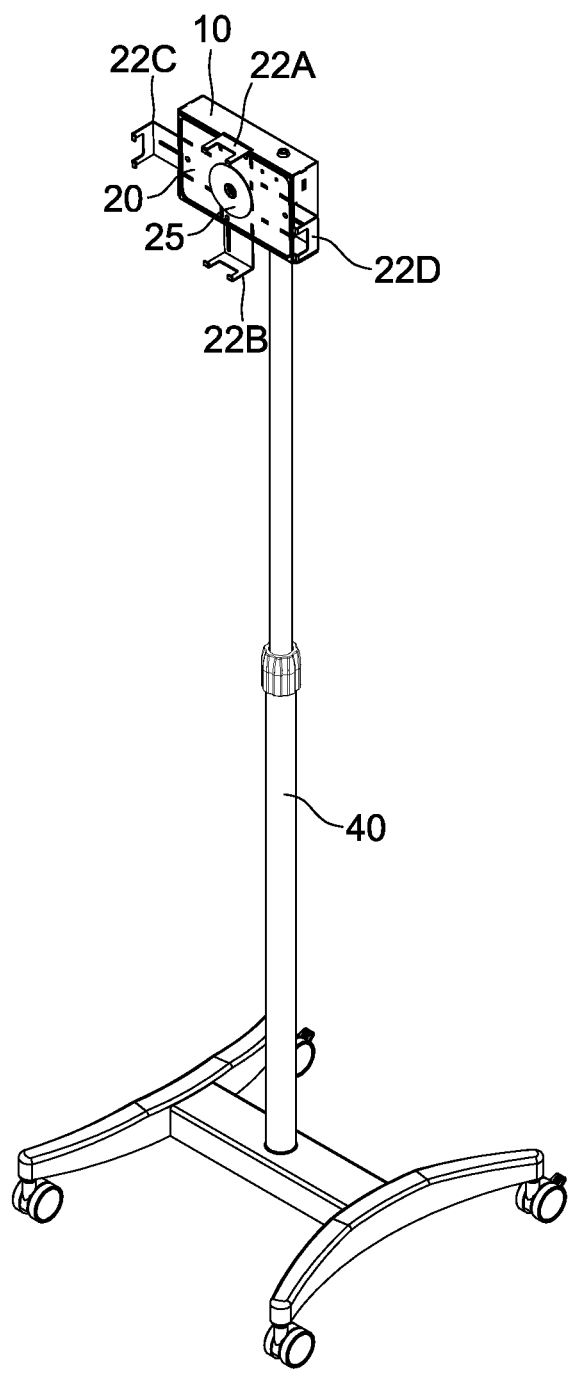
FIG. 11 is a perspective view, illustrating the present invention mounted to a movable stand.

(2) In the present invention, the carriage base 20 is provided with a backing plate 25 that allows for adjustment of the position thereof in a frontward/rearward direction so that after such adjustment, the backing plate could be adjusted for the position thereof to correspond to a thickness of a thickness-increased tablet electronic product 30B in order to tightly abut against the rear side of the tablet electronic product 30B (as shown in FIG. 9). Thus, in addition to being suitable for tablet electronic products 30, 30B of variable thicknesses (as shown in FIGS. 7 and 9), stability of the tablet electronic product 30, 30B is also improved, so that the tablet electronic products 30, 30B do not get vibrated due to contact or collision.

(3) In the present invention, the upper clamp member 22A, the lower clamp member 22B, the left clamp member 22C, and the right clamp member 22D are allowed to freely adjust the positions thereof for fixing, so that the upper clamp member 22A, the lower clamp member 22B, the left clamp member 22C and the right clamp member 22D can be adjusted of the positions thereof according to positions of a transmission socket, a power socket, and pushbuttons of the tablet electronic product 30 in order not to limit the tablet electronic product 30 to be clamped and fixed at a central portion of the carriage base 20 only (see an example shown in FIG. 10), and thus, preventing the engaging and retaining sections 221 from shielding and blocking and thus interfering with use or operation of the transmission socket, the power socket, and the pushbuttons of the tablet electronic product 30.

(4) Further, in the present invention, the encapsulation box 10, which is provided to close and cover the rear surface of the carriage base 20, may also function to cover and conceal the four fastening members 23A, 23B, 23C, 23D and the handle 26 to prevent a user from accidentally contacting and unexpectedly loosening the fastening members 23A, 23B, 23C, 23D so as to eliminate a potential risk of undesirably moving the upper clamp member 22A, the lower clamp member 22B, the left clamp member 22C, and the right clamp member 22D to lead to detaching and falling of the tablet electronic product 30.

(5) Further, in the present invention, the encapsulation box 10 is provided with a locking member 12 and the carriage base 20 is provided with a locking hole 27, and they are operable to lock and securely fix the carriage base 20 and the encapsulation box 10 in the closed condition in order to securely conceal the four fastening members 23A, 23B, 23C, 23D and the handle 26 for preventing an unauthorized person to rotate and loosen the four fastening members 23A, 23B, 23C, 23D on malignant purposes and also for safely keeping the upper clamp member 22A, the lower clamp member 22B, the left clamp member 22C, and the right clamp member 22D immobile to thereby reducing the risk of the tablet electronic product 30 being taken away without authorization. Thus, the present invention offers an effect of burglary protection.

(6) Further, in the present invention, the encapsulation box 10 is a box that may cover and close the rear side of the carriage base 20 and the encapsulation box 10 is provided with an internal space for accommodation, wherein such an accommodation space 13 may be used to hold and safe keep accessories, such as a mobile power supply, a touch stylus, a transmission cable, and a power cable, offering convenience and easiness of use.

I claim:

1. A tablet electronic product supporting frame, comprising an encapsulation box and a carriage base, wherein
the encapsulation box is in the form of a box, the encapsulation box being provided with pivot pins on one side portion thereof, the pivot pins being provided for rotatably coupling with the carriage base, so that the carriage base is rotatable about a support axis defined by the pivot pins to selectively open or close the encapsulation box, the encapsulation box being also provided with a locking member;
the carriage base is rotatably mounted to the pivot pins of the encapsulation box, the carriage base having a rear surface that is provided, on an upper part, a lower part, a left part, and a right part thereof, with constraint sections, the carriage base being provided with an upper clamp member, a lower clamp member, a left clamp member, and a right clamp member, each of the upper clamp member, the lower clamp member, the left clamp member, and the right clamp member having an outer end that is formed with an engaging and retaining section, each of the upper clamp member, the lower clamp member, the left clamp member, and the right clamp member being formed with a guide slot, which receives a fastening member to penetrate therethrough, each of the fastening members being rotatably mounted to the carriage base, such that the upper clamp member and the lower clamp member are constrained by the constraint sections and the fastening members to be movable along a vertically extending straight line and the left clamp member and the right clamp member are constrained by the constraint sections and the fastening member to be movable along a horizontally extending straight line, wherein rotating and tightening the fastening members selectively set the upper clamp member, the lower clamp member, the left clamp member, and the right clamp member immobile in fixed positions, the carriage base being provided with an adjustment screw rod rotatably mounted thereto, the adjustment screw rod having a front end extending to a front surface of the carriage base, the front end of the adjustment screw rod being provided with a backing plate, a rear end of the adjustment screw rod being provided with a handle, so that rotating the handle drives the backing plate to move frontward or rearward, the carriage base being provided with a locking hole, which corresponds to the locking member of the encapsulation box to allow the carriage base to be locked to and fixed with the encapsulation box.

\* \* \* \* \*